April 21, 1931.  A. DURESEN  1,802,050
FRAME FOR MOTOR VEHICLES
Filed Aug. 28, 1926   4 Sheets-Sheet 2

Inventor
Andrew Duresen
By his Attorneys
Williamson Rejt Williamson

April 21, 1931. A. DURESEN 1,802,050
FRAME FOR MOTOR VEHICLES
Filed Aug. 28, 1926    4 Sheets-Sheet 4

Patented Apr. 21, 1931

1,802,050

UNITED STATES PATENT OFFICE

ANDREW DURESEN, OF MINNEAPOLIS, MINNESOTA

FRAME FOR MOTOR VEHICLES

Application filed August 28, 1926. Serial No. 132,100.

This invention relates to a motorcycle, and particularly to a motorcycle of the type having single front and rear wheels.

It is an object of this invention to provide a motorcycle having a simple rigid frame and one which can be easily and inexpensively produced, and which will require very little, if any, machine finishing.

It is a further object of the invention to provide a motorcycle having a simple rigid frame comprising few parts, and constructed and arranged to support an efficient spring mechanism for supporting the frame from the wheels.

It is a further object of the invention to provide a motorcycle having a main frame largely formed in one integral piece and comprising a housing for the rear wheel, longitudinally extending portions at each side of said wheel and a body portion in front of said housing comprising a seat frame and having means thereon for supporting a hood enclosing said seat.

It is still another object of the invention to provide a motorcycle having a main frame formed largely of one integral piece, which piece has an upwardly and forwardly extending web or wall with channel members extending along each side thereof, and which has a bearing at its upper front end adapted to receive the fork in which the front wheel is mounted.

It is another object of the invention to provide such a motorcycle frame as set forth in the preceding paragraph which has a vertical rib preferably in the shaft of an I-beam extending rearwardly centrally from the upper front portion of said web or wall, together with a cowl extending rearwardly from said rib, said rib and cowl having bearings upstanding therefrom adapted to support a housing for a steering post or rod.

It is a further object of the invention to provide a motorcycle having a frame formed largely of one integral piece, which piece comprises a rear wheel housing extending over the top and greater portion of the rear wheel, longitudinally extending spaced channel members at each side of said housing, a body portion in front of and at the upper portion of said housing comprising a seat frame, said longitudinally extending portions extending forwardly of said housing to form a motor supporting means, said portions then extending upwardly and forwardly and being joined by a web or wall.

It is a still further object of the invention to provide a motorcycle frame as set forth in the preceding paragraph, in which the said integral piece of the frame has a cowl portion of general cylindrical shape extending forwardly from said body portion and having a vertical wall at its front portion from which a rib extends forwardly to said web or wall.

It is still another object of the invention to provide a motorcycle having a frame comprising front and rear portions adapted to straddle and have mounted therein the front and rear wheels respectively and having a body portion in front of the rear wheel having a seat frame formed thereon, which seat frame is adapted to receive a hood enclosing said seat frame.

It is still another object of the invention to provide a motorcycle having a frame formed largely of one piece, which piece comprises portions extending longitudinally at each side of the rear wheel and having an auxiliary swinging frame carrying wheels spaced respectively at each side of said rear wheel for supporting the motorcycle at certain times.

It is another object of the invention to provide a motorcycle having a front wheel and a frame comprising a fork having portions disposed at each side of said front wheel and supported therefrom, together with a steering wheel mounted adjacent the driver's seat for turning said fork to steer and stabilize said motorcycle.

It is also another object of the invention to provide a motorcycle having a frame with spaced longitudinally extending portions having motor supporting means thereon and portions extending at each side of the rear wheel and supported thereon, together with a housing or casing adapted to enclose the driving mechanism extending from said member to said rear wheel.

These and other objects and advantages of the invention will be fully set forth in the following description made in connection with the accompanying drawings, in which like reference characters refer to similar parts throughout the several views and in which:—

Figures 2, 3, 4, 5:
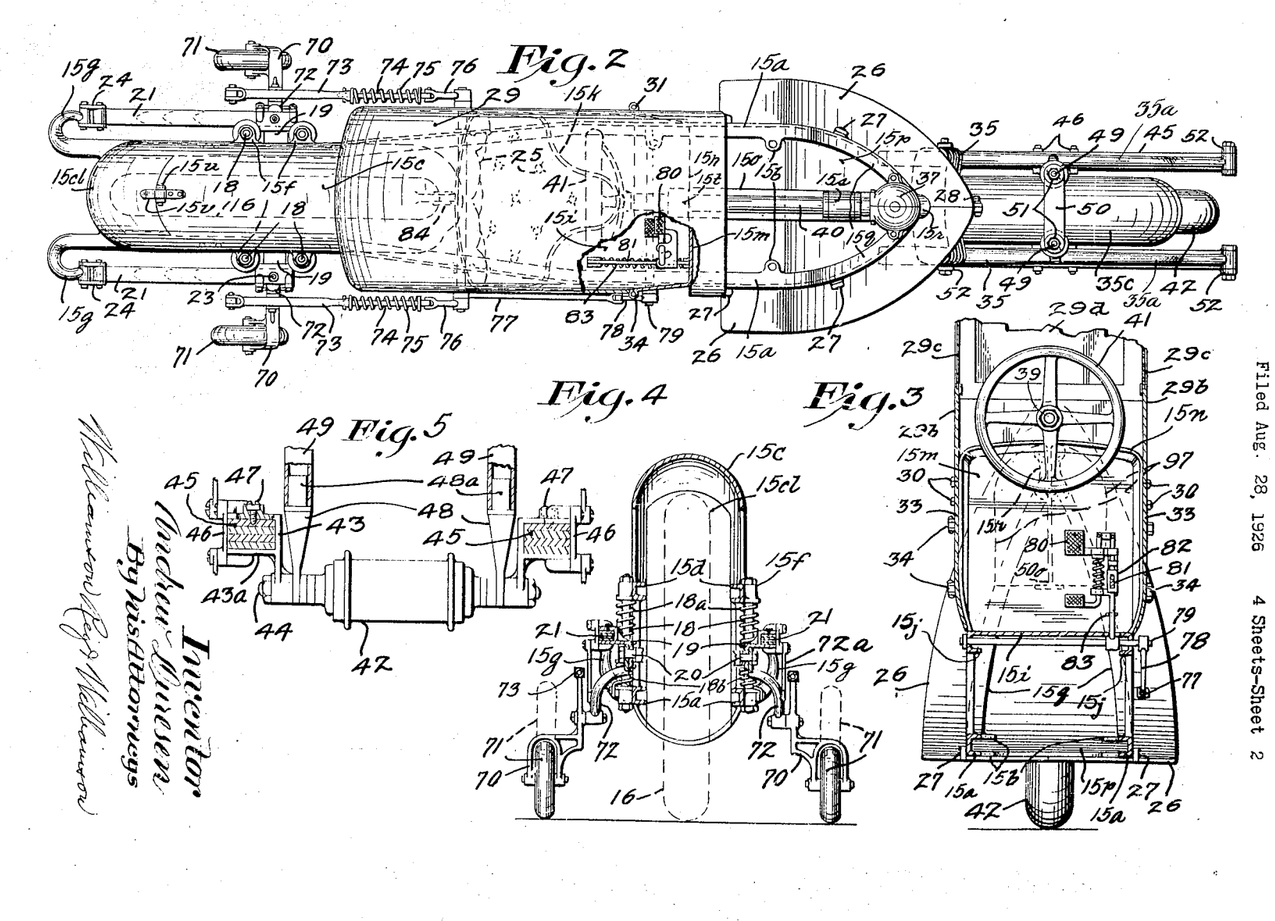
Fig. 2 is a top plan view of the motorcycle, certain parts being broken away.
Fig. 3 is a vertical section taken on line 3—3 of Fig. 1.
Fig. 4 is a vertical section taken on line 4—4 of Fig. 1.
Fig. 5 is a vertical section taken on line 5—5 of Fig. 1.
Figures 6, 7:
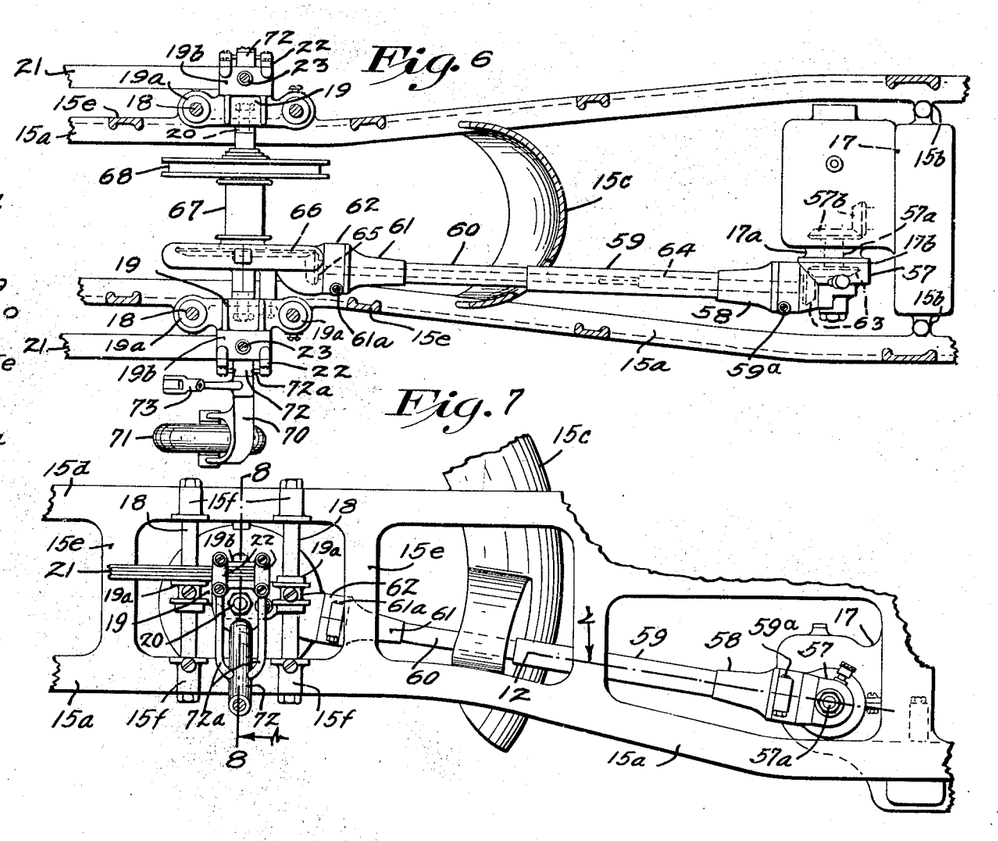
Fig. 6 is a horizontal section taken on line 6—6 of Fig. 1.
Fig. 7 is a view in side elevation of a portion of the frame.
Figure 8:
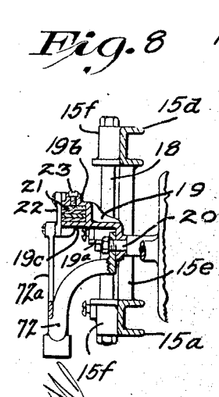
Fig. 8 is a view in vertical section taken on line 8—8 of Fig. 7.

Referring to the drawings, a portion of a motorcycle is shown comprising a frame designated generally as 15. Said frame is made principally as one casting which comprises the longitudinally extending side portions 15a which are horizontally spaced so as to be disposed at each side of the rear wheel indicated by the circles 16. The members or bars 15a form beams or sills and are of channel shape in cross section, having the channels facing each other, and at their forward portions have inwardly extending lugs 15b thereon longitudinally spaced and which form the attaching means for the motor of the machine shown in part at 17 and which is supported by and between the members 15a which thus form supporting sills for said motor. The members 15a extend upwardly longitudinally toward their rear ends and are integrally connected to a rear wheel housing 15c having the shape in cross section shown in Fig. 4. The members 15a extend across the housing 15c adjacent its lower end and below the center thereof. Spaced above and parallel with the rear portions of the members 15a are the longitudinally extending members 15d also integrally connected to the housing 15c and to the members 15a by the vertically extending braces 15e. The members 15a and 15d each have lugs 15f disposed at each side of the center of the housing 15c and which are respectively alined on the members 15a and 15d. The lugs 15f receive vertically extending headed and nutted rods 18 which are rigidly secured in said lugs. A bracket 19 is provided at each side of the wheel 16 mounted on the axle 20 thereof, which bracket has a hub or bearing portion 19a embracing the rods 18 and slidable thereon. The bracket 19 has an outer portion with upper and lower sides 19b and 19c respectively forming a recess therebetween rectangular in shape and open at its outer side which receives the end of the leaf spring 21. The spring 21 is held in place by straps 22 bolted to horizontally extending lugs in bracket 19. In order to hold the spring 21 against longitudinal movement, the screw 23 is threaded into the top of the bracket 19 and through a lug projecting upwardly therefrom into engagement with the top of spring 21. The springs 21 are connected by shackles 24 to reversely bent arms 15g cast integral with the ends of members 15a and with the lower portion of the housing 15c. Forward of the housing 15c the frame has a body portion 15h which is integral with the housing 15c and connected thereto by a narrow central rib.

At the lower portion of the body 15h is a horizontally extending floor or web 15i extending between the side members 15j also of shallow channel form spaced above the members 15a. At the upper portion of the body portion 15h is a seat frame 15k substantially right angular in formation, having substantially a horizontal portion and a rear vertical portion, which seat frame is adapted to receive the cushion 25 as indicated in dotted lines in Figs. 1 and 2. The floor 15i extends forwardly and somewhat upwardly and a vertical web or wall 15m extends vertically therefrom and forms the front portion of the cowl 15n which extends rearwardly from the wall 15m and is slightly flared. The wall 15m has extending forwardly therefrom a vertical rib 15o in the shape of a narrow I-beam and is integrally connected at its front end to a web or wall 15p which extends downwardly and somewhat rearwardly and extends horizontally a short distance between the inner sides of the members 15a. Channel shaped extensions 15q of members 15a extend upwardly along the web or wall 15p at the sides thereof to the upper end of said wall. Said wall has at its upper central portion a steering head or bearing 15r. A bearing 15s is supported above the forward end of the rib 15o by an arm extending vertically and integrally from said rib and another bearing 15t is likewise supported above the cowl 15n by an arm 15ab extending upwardly and rearwardly from the rib 15o and connected by a central rib to said cowl. The parts 15a to 15t described are formed or cast as one integral piece. The rear end of the wheel housing 15c has a section 15cl hinged thereto about the hinge 15u, whereby said section can be swung upwardly, the same being normally held in downward closed position by a spring 15v. The portions 15q have a two-piece mud guard 26 at the front thereof which has side portions overlapping the portions 15q and connected thereto by the screws 27. The two sections of the mud guard 26 are divided centrally and are also connected at their upper ends by screw 28 passing through mating lugs thereon. The frame 15 has a hood 29 above the body 15h thereof and surrounding the seat frame 15k. The hood rests upon the top of the flange surrounding the top of the body 15h and has a forward post 29a secured by screws 30 to flat seats in the sides of the cowl 15n. The hood 29 has a door 29b hinged to one side of the post 29a by the hinges 31 which will be held in closed position by a suitable latch 32. The door 29b may have a window 29c therein and a transparent windshield 29d will preferably be disposed in front of the hood 29. A door 33 is also provided at the side of the forward part of the seat portion 15k having its rear edge formed to fit along the front edge of the body portion 15h, said door being hinged to the rear edge of the cowl 15n by the hinges 34, the pintles of which are alined with the pintles of the hinges 31. The rib 15o supports at each side thereof fuel tanks 97 shown in Fig. 1 and in dotted lines in Fig. 3.

A fork member 35 constitutes part of the frame of the motorcycle and has a spindle journaled in the head or bearing 15r. The upper end of the fork has a gear 36 secured thereto disposed within the gear housing 37 which gear 36 meshes with a gear 38 of the same diameter which is in turn secured to a shaft 39 enclosed within the sleeve or housing 40 mounted in the bearings 15s and 15t. The shaft 39 has a steering wheel 41 secured to its inner end which wheel is disposed in front of the seat 15k in convenient position for manipulation by the driver. The fork 35 has portions disposed at each side of the front wheel 42 which portions have upper members 35a and the lower members 35b. A bracket 43 is mounted on the axle 44 of the wheel 42 which has upper and lower flanges 43a forming a rectangular recess therebetween with an open side in which is disposed the rigid or central portion of the leaf spring 45. The spring is held in place by the cap plates 46 bolted to lugs on bracket 43. The bracket 43 also has an upstanding lug at the top thereof in which a screw 47 is threaded which screw engages the top of the spring 45 and holds the same against longitudinal movement. Brackets 48 are also mounted on the axle 44 of the wheel 42 and extend vertically therefrom having reduced upwardly projecting portions 48a to which are secured vertically extending tubular rods 49 extending through bosses formed on the members 35a and 35b. The rods 49 are joined together at their upper ends by a bar 50 held in place by the nuts 51. The leaf spring 45 is connected to the ends of the member 35 by shackle members 52. The rods 49 have collars 49a secured thereto above the members 35b and coil springs 53 surround the rods 49 bearing at their lower ends against the collars 49a and at their upper ends against the frame member 35a. Tension coil springs 54 surround the rods 49 above frame members 35a and have their lower ends resting against and secured to pins projecting from the frame member 35a and their upper ends resting against the bar 50 and secured to pins projecting from the ends thereof. A housing 35c is secured to the fork 35 preferably by rods 35d secured to bracket 43 to said housing.

Figure 1:
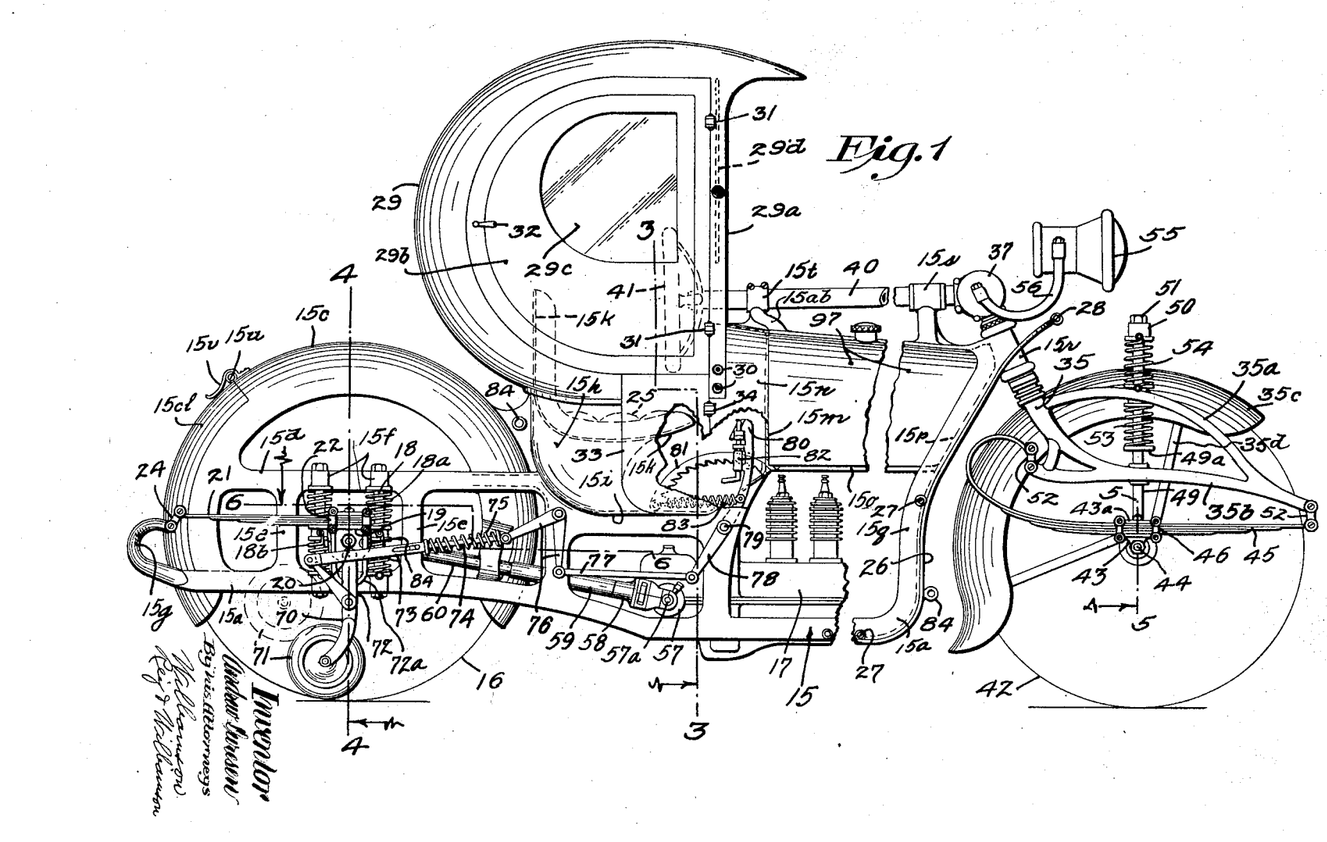
Fig. 1 is a view in side elevation of a motorcycle, certain parts being omitted so that the frame may be more easily seen and some parts being broken away.
Figures 9, 11, 12:
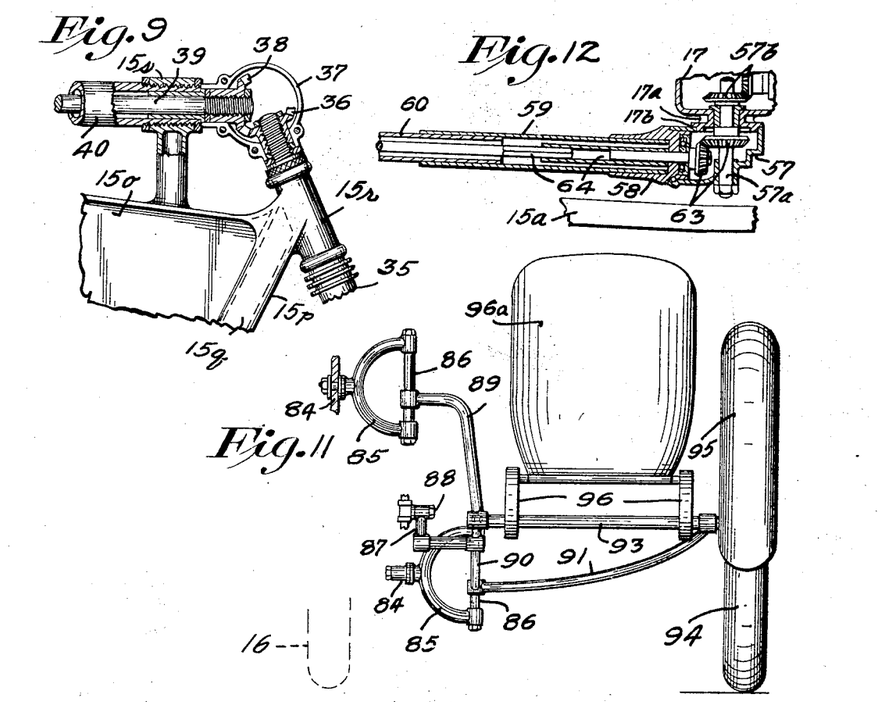
Fig. 9 is a vertical section through the steering hood and adjacent parts.
Fig. 11 is a view in end elevation thereof.
Fig. 12 is a horizontal section taken on line 12—12 of Fig. 7.

In Fig. 1 a lamp 55 is shown supported from the housing 37 by a bracket 56. A hub 17a projects from the casing of the engine 17 on which is revolubly mounted a gear housing 57 having bearings on the portion 17b of said hub and on the gear shaft 57a. A sleeve 58 is removably held in housing 37 by a screw 59a passing through said housing and a groove in the side of the sleeve 58. Screw 59a thus holds sleeve 58 against rotation and from withdrawal. The sleeve 58 has a housing tube 59 extending therefrom in which is telescoped a tube 60 also having a sleeve 61 at its end removably held in the gear housing 62 by a screw 61a similar to the screw 59a. A motor 17 drives shaft 57a through gears 57b and said shaft through gears 63 drives a shaft 64 comprising longitudinally movable sections as shown in Fig. 12. Shaft 64 through pivot gears 65 and 66 drives the rear wheel 16, gear 66 being secured to hub 67 of said wheel. Owing to the fact that the frame is guided in a vertical direction when the leaf springs 21 and 45 are flexed, the shaft 64 and its housing must be extensible. The housing swinging about the motor casing eliminates the necessity for a universal joint.

An auxiliary frame and means are provided for supporting the motorcycle when standing still or moving at low speeds. Brackets 70 are provided having forks at their lower ends in which are revolubly carried the small wheels 71. The brackets 70 are swingingly mounted in hubs disposed at the lower end of the brackets 72 extending upwardly and inwardly and having flanges mounted on the axle 20 of the rear wheel 16 outward of the brackets 19, said brackets 19 and 72 being held in place by the nuts threaded on the ends of said axle. To prevent the brackets 72 from turning about axle 20 the same have the integral arms 72a extending upward therefrom at each side of the said axle which are secured at their upper ends to the bracket 19 by the screws holding the lower ends of the cap plates or straps 22. The brackets 70 have arms extending above their pivotal points secured at their upper ends to rods 73. The rods 73 preferably are in the form of tubes and have extending therein the small rods 74 having pins projecting at the sides thereof moving in slots formed adjacent the ends of the rods 73. The rods 74 have collars at their forward ends between which and the ends of rods 73 are disposed the coil compression springs 75. The rods 74 at their forward ends are pivotally connected to one arm of a bell crank lever 76 swinging about a pivot secured to the frame 15, the other arm of which lever projects downwardly and is pivotally connected to the rear ends of the link 77 which in turn is pivotally connected at its forward end to the lower end of a lever arm 78. The arm 78 is secured to the outer end of the shaft 79 journaled in the frame portion 15j which shaft has a pedal lever 80 projecting upwardly through an opening in the floor or web 15i in front of the right hand side of the seat 15k. A curved ratchet bar 81 is disposed at one side of the pedal lever 80 and said lever carries a spring pressed pawl 82 adapted to engage the teeth formed on the lower side of the bar 81. The pedal lever 80 normally is urged to its rearward position by a tension coil spring 83 secured to its lower portion and to the rear end of the bar 81. When the pawl 82 is released and the spring 83 permitted to retract pedal lever 80, the brackets 70 are swung upwardly so that the wheels 71 are normally held in raised position out of contact with the ground as indicated by the dotted lines in Figs. 1 and 4.

Figure 10:
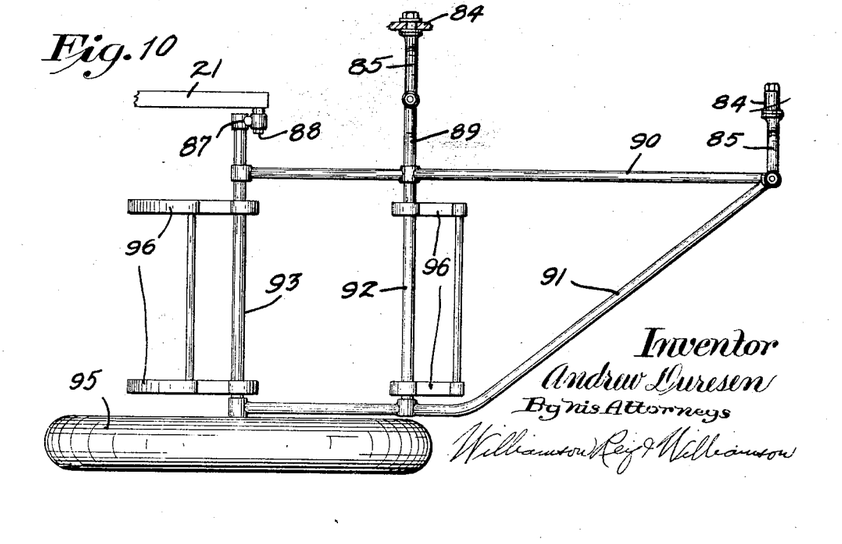
Fig. 10 is a plan view of a side car attachment used.

The frame 15a is constructed and arranged to have a side car connected thereto and for this purpose the same is provided with apertured lugs 84 adapted to receive attaching studs for parts of the side car frame. Brackets 85 of yoke shape and having vertical rods 86 secured therein at their outer sides are attached in the forward lugs 84 as shown in Figs. 10 and 11 and an arm 87 is pivotally secured by a stud 88 in the rear lug 84. The rods 86 have slidably mounted thereon sleeves formed on the end of bars 89 and 90 respectively, which are parts of a side car frame as shown in Figs. 10 and 11, said frame also comprising the longitudinally extending bar 91, transverse bar 92 and the axle 93. A supporting wheel 94 is journaled on the outer end of the axle 93 over which is supported the housing 95. The side car body 96a is shown supported from bars 92 and axle 93 by the springs 96. With the described structure, it is seen that relative vertical movement is possible between the side car frame and the frame 15 of the motorcycle proper.

In operation the rear wheels 16 will be driven from the engine 17 through the gears 63, drive shaft 64 and the gears 65 and 66. The frame 15 and the portion thereof forming the fork 35 will be supported by the front and rear wheels. The said frame parts will be supported directly by the leaf springs 21 and 45. In the flexing of these springs the frame will be guided in a vertical direction by the rods 18 at the front and rear sides of the axle of the rear wheel and the rods 49 at the sides of the front wheel. As the frame moves up and down due to inequalities in the road, the leaf spring 45 will be flexed and the frame member 35 will move downwardly extending the spring 54 and compressing the spring 53. The springs 53 and 54 thus form auxiliary springs for additionally and resiliently supporting the frame. As the rear end of the frame vibrates, leaf spring 21 will be flexed and the lower springs 18b will be extended in the downward movement of the frame. The upper springs 18a will act as shock absorbing or recoil springs and will be compressed when the frame 15 moves upwardly. The driver will occupy the seat 15k and will balance and steer the motorcycle by turning the steering wheel 41. This wheel being geared to the fork 35 by gears of equal diameter or having a one to one ratio, the fork 35 can be turned directly by the wheel 41 just the same as a fork is ordinarily turned by a pair of handle bars connected directly thereto. The machine can thus be easily balanced and steered. When the machine is to be brought to a stop or is moving at slow speed and additional supporting means are desired, the operator will press forwardly on the pedal lever 80. This will swing arm 78 and link 77 rearwardly and push rearwardly on rods 74 and 73 as well as on the upwardly extending arm of bracket 70. Said brackets 70 and wheels 71 will thus be swung down so that said wheels will contact the ground as shown in full lines in Figs. 1 and 4. The machine will thus be supported in stable equilibrium. The pedal lever 80 will be held in a position to which it is moved by the pawl 82. When it is desired to raise the wheels 71 and brackets 70, pawl 82 will be released and spring 83 will retract the lever arm 80 and move the brackets 70 and wheels 71 to their upper inoperative position. The driver will be snugly housed in hood 29 and thus be protected from the weather. The side car shown in Figs. 10 and 11 may be attached to the motorcycle as already shown and described.

From the above description it is seen that applicant has provided a very simple and efficient form of motorcycle frame and one which can be easily and inexpensively produced. The frame is particularly adapted to support the motor in convenient position and to accommodate the supporting means at the wheels, so that a very desirable spring action is secured. As above stated, the frame is made principally in one piece and is thus very rigid. The parts of the frame are also arranged so that a frame of great strength is secured.

It will, of course, be understood that various changes may be made in the form, details, arrangement and proportions of the parts, without departing from the scope of applicant's invention, which, generally stated, consists in the novel parts and combinations of parts disclosed and defined in the appended claims.

What is claimed is:—

1. A frame for a motorcycle having an upwardly and forwardly extending web in the rear of the front wheel, channel members extending along each side of said web and extending horizontally rearwardly from the bottom thereof to form motor supporting means, said members extending rearwardly from said motor and a rear wheel housing integrally connected between the same, said frame also having spaced longitudinally extending members above said channel members at each side of the rear wheel, said members and said channel members having alined bosses thereon adapted to receive rods disposed in the front and rear of the axle of said rear wheel for supporting auxiliary spring members.

2. A frame for a motorcycle comprising longitudinally extending spaced channel members having their channel portions facing each other and having lugs thereon adapted to have a motor secured thereto, said channel members extending rearwardly below the axle of the rear wheel and having reversely bent arms adapted to be connected by shackles to leaf springs supported respectively at each end of the axle of the rear wheel, said frame also having spaced longitudinally extending members above said channel members at each side of the rear wheel, said members and said channel members having aligned bosses thereon adapted to receive rods disposed in the front and rear of the axle of said rear wheel for supporting auxiliary spring members, and a rear wheel housing integrally connected to the rear ends of said channel members and last mentioned members and disposed therebetween.

3. A frame for a motorcycle comprising an integral member having spaced longitudinally extending channel members having means for supporting a motor between the lower portions thereof, said members extending rearwardly at each side of the rear wheel and having means for receiving spring means, said members extending upwardly and forwardly at the rear of the front wheel, a web extending between said members at said upwardly and forwardly extending portions, a central rib extending rearwardly from said latter portion at the upper end thereof, a cowl extending rearwardly from the rear end of said rib and a body portion disposed in the rear of said cowl.

4. A motorcycle frame comprising an integral member having horizontally spaced members adapted to be disposed at each side of the rear wheel, each comprising vertically spaced bars extending longitudinally of said frame and connected by spaced vertical bars, and a rear wheel housing integrally connected to and between said bars at their rear portions and a body having a seat frame therein integrally connected to the upper portions forwardly of said housing.

5. A motorcycle frame comprising an integral member having horizontal spaced bars, a body integral with and extending between said bars at an intermediate portion thereof and including a seat frame, a cowl integral with and in front of said body extending between said bars and a detachable hood supported on said body and cowl and enclosing said seat frame.

6. A frame for a motorcycle comprising horizontally spaced longitudinally extending members having engine supporting means thereon, said members extending upwardly and forwardly in converging relation in the rear of the front wheel, a steering head to which said members are secured and a mudguard secured to said members at their upwardly and forwardly extending portions, said mudguard comprising two sections secured respectively to said members and bolted together at their upper ends which ends extend beyond said steering head.

7. A motorcycle frame comprising means for supporting a motor, a transmission housing having a portion adapted to be revolubly mounted on the motor frame, an intermediate portion having a cylindrical portion received in said housing, and a screw extending through the side of said housing and through a groove in said cylindrical portion whereby said intermediate portion is held from rotating and longitudinal movement, but may be readily removed on removal of said screw.

8. A frame for a motorcycle comprising spaced channel members, a steering head at the upper front end of said frame carried by and integral with said channel members, said channel members diverging and extending downwardly, a reinforcing web secured to and extending between said channel members at the front end of said frame and a vertically disposed web extending rearwardly from said steering head centrally of said frame.

9. A frame for a motorcycle having a steering head integral therewith at its upper forward end and comprising spaced channel members extending downwardly in diverging relation from said head and having a reinforcing web extending therebetween at the front end of said frame, said channel members extending horizontally in diverging relation at the bottom of said frame to form a motor supporting base, vertically extending portions at each side of said frame adapted to be disposed opposite the fly wheel of said engine, a cowl carried by and integral with said vertically disposed portions, a vertically extending wall at the forward end of said cowl and a vertically disposed rib extending forwardly between said wall and the upper front end of said frame.

10. A frame for a motorcycle having at its central portion a body frame, a vertically extending wall at the forward portion of said body frame, a central vertical forwardly extending rib on said body portion, and a driver's seat frame formed integrally with said rib and within said body frame 11. A frame for a motorcycle comprising a rear wall housing, lower horizontal members extending at each side thereof, spaced vertically extending members integral with said horizontal members, and upper horizontal members extending at each side of said frame integrally connected with said vertical members, and a rear wheel housing integrally connected to the rear end of said horizontal members extending to and between the front ends of said horizontal members.

12. A frame for a motorcycle comprising spaced members extending longitudinally of the frame, spaced horizontal members spaced above said first mentioned members, a floor extending between said last mentioned members and integral therewith, and vertically extending members at the forward end of said horizontal members constituting with said floor a body frame support.

13. A frame for a motorcycle comprising a head at the upper front end thereof adapted to receive the front wheel fork, a central vertically disposed rib extending rearwardly from and below said head, members extending downwardly from said steering head in diverging relation, said rib having portions extending horizontally from the bottom of said rib, said ribs forming means for receiving and having attached thereto an oil tank.

14. A one-piece motorcycle frame comprising a seat frame having plate-like sides and bottom, a rear wheel housing, spaced horizontally extending members at each side of said housing and connected to said body frame and a central vertically disposed rib extending between and integral with said body frame and rear wheel housing.

15. A frame for a motorcycle comprising a portion at its upper front end adapted to receive the front wheel fork, a central vertically disposed rib extending substantially horizontally rearwardly from and below said first mentioned portion, and a pair of spaced arm brackets having horizontal tubular upper ends upstanding from said rib and integral therewith adapted to receive a tubular housing.

16. A frame for a motorcycle comprising a portion extending at one side of the rear wheel having spaced upper and lower horizontally extending bars between which the axle projects, rods extending between said bars at the front and rear of said axle and fixedly mounted therein, a plate having a recess adapted to receive a leaf spring and having a depending portion apertured to fit over the end of said axle, said plate also having spaced lugs apertured to receive said rods, whereby said plate is prevented from rotative movement about said axle.

17. A frame for a motorcycle comprising a portion extending at one side of the rear wheel through which the rear axle projects, a plate having an apertured portion adapted to receive said axle, means for preventing rotation of said spring plate about said axle, a depending bracket having a portion apertured to receive the end of said axle, and spaced means connected to said bracket and connected to said plate for preventing rotative movement of said bracket about said axle.

18. A frame for a motorcycle comprising an upwardly and rearwardly extending portion at its upper front end adapted to receive the front wheel fork, a portion extending substantially horizontally from said first mentioned portion, spaced brackets projecting from said last mentioned portion having substantially horizontal tubular upper ends, a housing secured in and extending between said brackets and adapted to house a steering shaft and a housing at the front end of said housing and above said first mentioned portion adapted to house steering gears.

19. A motorcycle frame comprising spaced portions adapted to receive a rear axle, a housing supported on said axle for housing the driving gears of said axle, a transmission housing extending forwardly from said housing and having a cylindrical portion received in said first mentioned housing and having a screw extending at right angles to the axis of said cylindrical portion through the side of said first mentioned housing and one side of said cylindrical portion of said second mentioned housing, whereby the last mentioned housing is prevented from rotative and longitudinal movement, but may be readily removed upon removal of said screw.

20. A frame for a motor cycle including integral longitudinally extending vertically spaced members disposed at each side of the rear wheel and disposed above and below the axle thereof, horizontally spaced vertically extending members extending between and integral with said members at each side of the axle and at each side of said wheel respectively, lugs on said vertically spaced members at each side of the axle, and rods secured in said lugs adapted to receive springs.

21. A frame for a motor cycle having an upwardly and forwardly extending web in the rear of the front wheel, a central rib extending rearwardly at the top of said frame and web, channel members having their channels facing each other extending along each side of said web downwardly and rearwardly from the upper front end of said frame then horizontally rearwardly to form motor supporting means, then extending slightly upwardly and rearwardly and a rear wheel housing of over 180 degrees in extent and semi-cylindrical shape in cross section secured to said channel members at each end and having its sides secured to said channel members respectively.

22. A motor cycle frame having in combination, an integral frame having a portion at its upper front end adapted to receive a fork for supporting the front wheel, spaced members extending downwardly and rearwardly of said portion and then horizontally having vertically extending members secured thereto and adapted to be disposed at each side of the rear wheel, a rear wheel housing integrally connected to said members at the rear end of said frame and apertured lugs on said frame at the front portion of said rear wheel housing adjacent the top thereof and adjacent the bottom of said frame and at its front portion at the rear of the front wheel adapted to receive supporting members for a side car.

In testimony whereof I affix my signature.

ANDREW DURESEN.